Aug. 13, 1929.    W. F. GRIMES    1,724,576
METHOD OF MEASURING DISTANCE
Original Filed Jan. 7, 1925
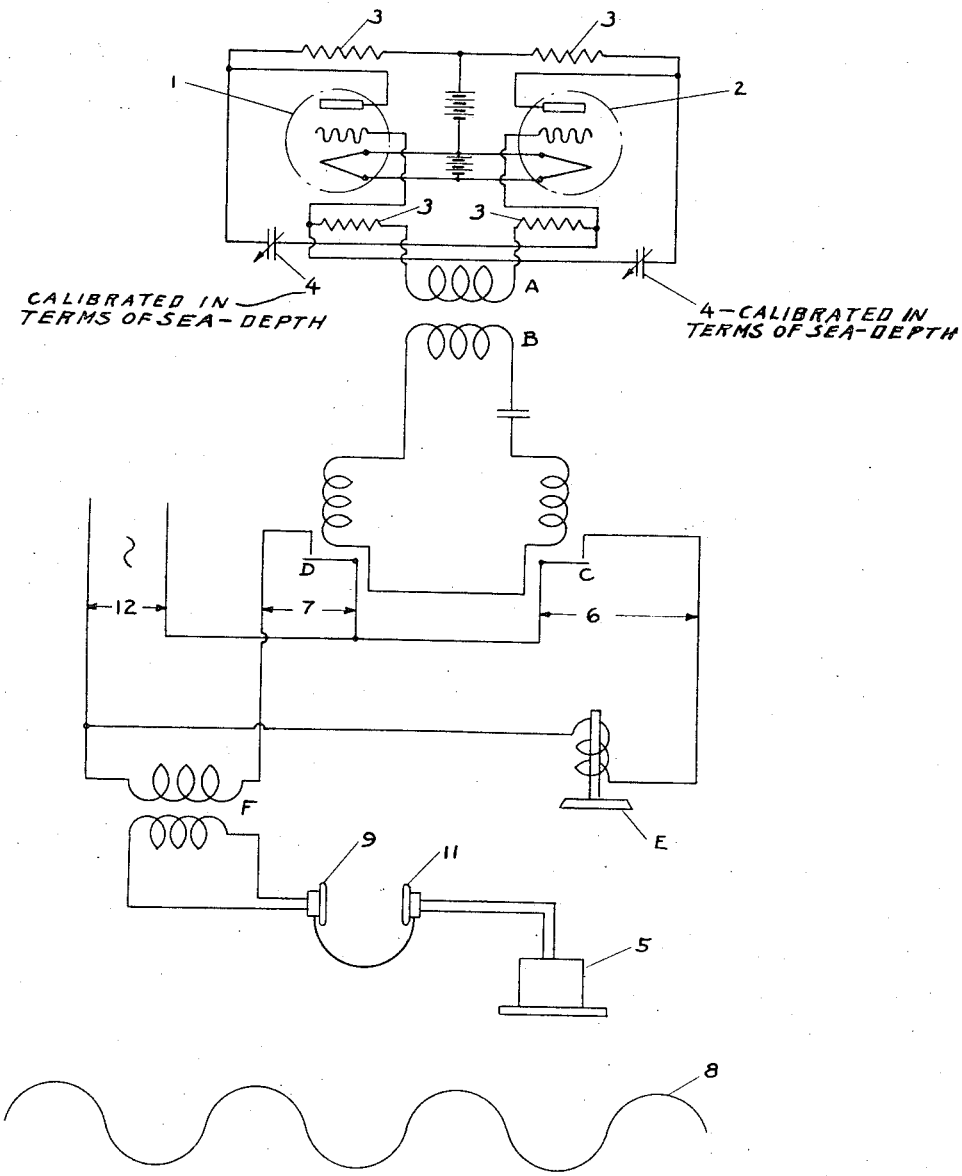
Inventor
William F. Grimes
By Harold Dodd
Attorney Patented Aug. 13, 1929.

UNITED STATES PATENT OFFICE.

1,724,576

WILLIAM F. GRIMES, OF SOUTH PASADENA, CALIFORNIA.

METHOD OF MEASURING DISTANCE.

Original application filed January 7, 1925, Serial No. 1,134. Divided and this application filed June 24, 1927. Serial No. 201,565.

This application is a division of application Serial No. 1,134, filed by me January 7, 1925.

My invention relates broadly to a system for determining ranges by means of sound waves but more particularly to such a system when operated to determine sea depths and has for an object the elimination of mechanical control of the signals used and the control of said signals electrically.

A further object is to provide a simple and efficient system which will occupy a small space and which can be operated by one not skilled in the art.

With these and other objects in view my invention can be best understood by reference to the accompanying drawing which is a diagrammatic illustration of my invention and in which circuit "A" may be any conventional oscillating circuit, the selected constants of which are such that there is produced an alternating current of a very low and constant frequency. The circuit shown has been selected because of its simplicity and in it use has been made of vacuum tubes (1) and (2), inductances A and B, resistances 3 and variable condensers (4), connected in a conventional form. Circuit "A" is inductively coupled to circuit "B," thereby producing a circulating current in circuit "B" of a desired frequency. The circulating current in circuit "B" flows through the two polarized relays "C" and "D," said polarized relays being so connected that one will function on the positive lobe and the other on the negative lobe of the alternating current circuit (12). Polarized relay "C" serves to close the exciting circuit (6) for the oscillator or noise maker "E", the frequency of which is constant. "E" can be any suitable oscillator operated by a source of alternating current connected to wires 12 and which is capable of producing a sound which may be reflected back as an echo to the microphone (5) from reflecting surface (8). Polarized relay "D" serves to close the circuit (7) through the transformer "F" which in turn will produce a signal in telephone receiver (9) of the two-phone head piece "G". The second telephone receiver (11) is connected directly to the microphone (5).

The operation of my invention is substantially as follows:

With circuit "A" tuned to a particular frequency signals will be sent out from oscillator "E" at certain definite intervals of time, the time element being controlled electrically rather than mechanically as has been the practice heretofore. The signals so sent return from the reflecting surface (8) as echoes and are picked up by microphone (5). Microphone (5) may be any type suitable for converting sound energy into electrical energy. The echoes so collected and converted into electrical energy are transferred to receiver (11). At intervals halfway between the groups of outgoing signals, a second signal is made in receiver (9) through the medium of the contacts of the polarized relay "D" and the transformer "F". When the frequency of circuit "A" is so adjusted that the echo from the reflecting surface (8) is received in receiver (11) at exactly the same instant that a direct electrical signal from "F" is received in receiver (9), then, the distance the sound has traveled from "E" to the reflecting surface (8) can be readily calculated. Although there are other methods of procedure for determining whether the receipt of a signal is simultaneous with the transmission of the next subsequent signal, the method which I have employed and have found satisfactory is to vary the condenser dials across the full scale or to move them so that the frequency of the alternating current generated is lower. As this is done, if the device is not operating the desired interval there will be a number of binaural centers passed as the dials are rotated. Finally these will cease, then the procedure is to rotate the dials in the reverse direction until the first binaural center is reached. This then corresponds to the point at which the receipt of the signal at 5 is simultaneous with the production of the signal at 9 by the next subsequent peak of the alternating current produced by the generator A. In order that the operation of my invention may be facilitated, it is desirable to calibrate the variable condensers (4) in circuit "A" in terms of sea-depth. By so doing, direct readings in terms of depth may be taken.

It is understood that the above description and accompanying drawings disclose only the preferred embodiment of my invention and that various minor changes in details of construction, proportion, and arrangement of parts may be resorted to within the scope of the appended claims and without sacrificing any of the advantages of my invention.

Having described my invention I claim:—

1. The method of determining the distance between a known point and a surface capable of reflecting sound waves which method consists in periodically transmitting a sonic signal toward said surface at a point in time corresponding to a known amplitude of voltage of a half cycle of alternating current, varying the periodicity of said sonic signals by the frequency of said alternating current so that the echo of one signal of the series is received at said point at a similar known amplitude of voltage of the next succeeding half cycle of said alternating current and calculating the distance of said surface from said point as a function of the frequency of said alternating current.

2. The method of determining the distance between a known point and a surface capable of reflecting sound waves which method consists in periodically transmitting a sonic signal toward said surface at a point in time corresponding to a known amplitude of current of a half cycle of alternating current, varying the periodicity of said sonic signals by the frequency of said alternating current so that the echo of one signal of the series is received at said point at a similar known amplitude of voltage of the next succeeding half cycle of said alternating current and calculating the distance of said surface from said point as a function of the frequency of said alternating current.

3. The method of measuring distance which consists in producing and directing a sonic signal toward an objective, permitting a sufficient interval of time to pass for the echo of the signal to return from said objective, producing a second signal simultaneously with the receipt of the echo of said first signal and varying the interval between signals through the control of the frequency of an electric current external to the current producing said signals, the frequency of said electric current constituting an indicium of the distance to be measured.

4. A method of measuring distance which consists in periodically producing and directing sonic signals toward an objective at one peak of an electric current, permitting a sufficient interval of time to pass for the echo of the signal to return from the objective, producing another signal at a subsequent peak of the said electric current, receiving the echo of the signal from the objective, and adjusting the time interval between the peaks of the electric current to such a value that the receipt of said echo and the production of the subsequent signal are simultaneous in time.

5. A method of measuring distances which consists in periodically producing and directing sonic signals toward an objective at one peak of an alternating current, permitting a sufficient interval of time to pass for the echo of the signal to return from the objective producing a subsequent signal at a subsequent peak of the said alternating current, receiving the echo of the signal from the objective and adjusting the interval between the peaks of the alternating current to such a value that the receipt of the echo and the production of the subsequent signal are simultaneous in time.

6. A method of measuring distance by means of sonic signals which consists in adjusting the transmission of a series of sonic signals toward an objective so that the reception of an echo of one signal of said series from said objective bears a definite relationship the production of another signal of said series, said adjustment of said series of transmitted signals being accomplished by variations in the frequency of an electric current external to that current producing the signals.

7. A method of measuring distance by means of sonic signals which consists in adjusting the transmission of a series of sonic signals toward an objective so that the time of reception of an echo of one signal of said series from said objective is substantially one half the time between the production of the first signal, the production of another signal of said series, said adjustment of said series of transmitted signals being accomplished by variations in the frequency of an alternating current external to that current producing the signals.

WILLIAM F. GRIMES.